Patented Jan. 16, 1940

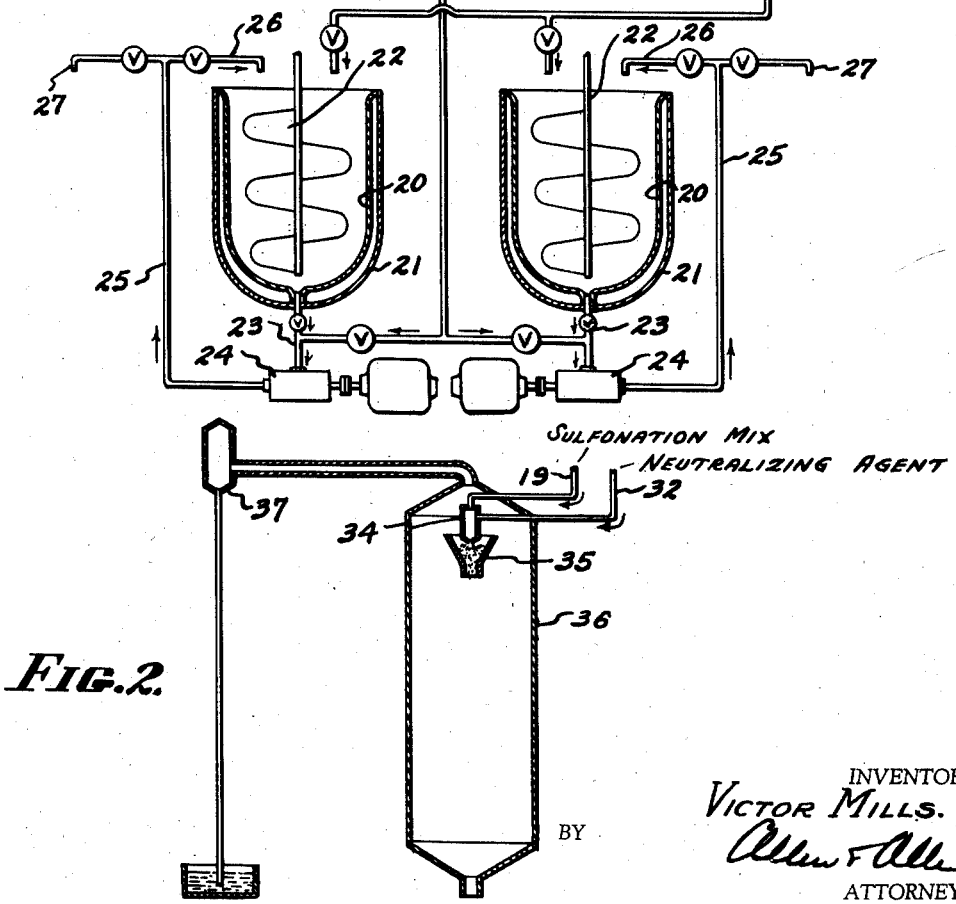

2,187,244

UNITED STATES PATENT OFFICE 2,187,244

SULPHONATION

Victor Mills, Cincinnati, Ohio, assignor to The Procter & Gamble Company, Cincinnati, Ohio, a corporation of Ohio Application September 4, 1936, Serial No. 99,461

12 Claims. (Cl. 260—459)

My invention relates to a method for treating a sulphonatable or sulphatable material with a sulphonating or sulphating agent, and more specifically comprises combining continuously flowing streams of a high molecular weight aliphatic alcohol or mixture of such alcohols and a sulphating agent in predetermined proportions whereby chemical reaction occurs to the desired degree, and arresting the action of said sulphating agent before undesirable side reactions have occurred to any substantial extent.

Some of the objects of my invention are: to provide a continuous and rapid process for sulphating high molecular aliphatic alcohols, to decrease the time of contact between the materials whereby undesirable products of side reactions are not formed to any substantial extent, to produce a sulphated product of improved quality, to reduce the amount of equipment required for sulphation reactions, and to reduce the cost of maintenance and operation of such equipment.

The following description will be devoted mainly to the sulphation of high molecular alcohols, such as those derived from natural fats and oils by catalytic reduction, with concentrated sulphuric acid.

As far as I am aware, the prior art methods of both sulphation and true sulphonation do not bring the constituents of the reaction into direct contact at the start in proper proportions for chemical combination, but there is at this time an overwhelming excess of one of the constituents, and the other is added slowly over a considerable period of time. No means has heretofore been provided for removing the products of the reaction as fast as formed.

Heretofore the use of sulphuric acid in the sulphation of the higher molecular fatty alcohols in the preparation of wetting, sudsing and detergent agents has not been entirely satisfactory commercially because of the relatively dark color, poor yields and low efficiencies of the products in their wetting, sudsing and detergent action as compared with the results obtained by the use of a more expensive reagent, chlorsulphonic acid.

Furthermore, it has always been considered necessary in the sulphation of high molecular weight aliphatic alcohols even with chlorsulphonic acid as well as with sulphuric acid to carefully restrict the rise in temperature by adding the acid to the alcohol only very slowly, and by cooling, in order to minimize charring and other undesirable side reactions. Since such control unavoidably retards the rate of reaction, the time required to complete the sulphation is greatly extended. During this extended period any excess sulphating agent remains active and, in spite of the low temperature maintained, by-products of side reactions, such as ethers, ketones, etc., generally result. These by-products in general do not possess the valuable properties of the main product and in many instances have a distinctly deleterious effect on the valuable properties which would be possessed by the main product if substantially pure.

I have found, contrary to prior ideas on sulphation reactions, that mixing the materials for example sulphuric acid and the high molecular alcohol directly in the proportions required for complete sulphation and allowing the heat of reaction to raise the temperature of the mixture beyond the limits heretofore used, thereby effecting almost instantaneous reaction, is not harmful provided that the reaction is promptly arrested by cooling or by neutralization as soon as the main reaction has progressed to the desired extent and before undesirable side reactions have taken place to any substantial extent. The undesired side reactions appear to take place mainly after the main reaction is completed.

Thus my invention makes possible the use of sulphuric acid in the production of unusually good wetting, sudsing and detergent agents of light color and not only overcomes previous difficulties in that the sulphated material is substantially free from harmful products of side reactions, but also in that it accomplishes the desired result in a continuous and extremely rapid manner.

The method of operating my process will be more easily comprehended from a description of the attached drawings in which Figure 1 shows diagrammatically a preferred form of apparatus for carrying out my process, and Figure 2 shows diagrammatically an alternate form of apparatus for carrying out the neutralization step.

Referring first to Figure 1, high molecular aliphatic alcohol is stored in tank 1 which may or may not contain means for temperature regulation such as coil 2. The alcohol, in the process of operation, is conducted from storage tank 1 through conduit 3 containing a flow meter 4 to the inlet side of a variable delivery pump 5 actuated by motive means 7 through suitable power transmitting means 6. It is then delivered by pump 5 through conduit 8 to the inlet side of a mixer 9 which is operated in a suitable manner by motive means 10. The sulphating agent is stored in tank 11 and is conducted to the mixer 9 through the conduit 12, flow meter 13, and conduit 14, by the variable delivery pump 15 operated in a suitable manner by motive means 16.

The mixed ingredients are then conducted from the mixer 9 by means of conduit 17 to reaction chamber (or coil) 18 wherein the desired completeness of reaction is obtained. The size of the reaction coil or chamber will vary, depending mainly on the acid concentration, on the alcohol or particular mixture of same used, and on the time required to effect the desired degree of reaction. In certain applications of my invention, I find that the reaction can be brought to substantial completion within a few seconds if the heat produced by the reaction of the constituents is allowed to raise the temperature of the reaction mix rather than be absorbed and dissipated by a cooling medium. In those applications of my invention, however, in which the reaction is substantially instantaneous and side reactions would occur, for example, within a fraction of a second after the constituents are brought into contact if the temperature were allowed to rise without any limitation, I may reduce the rate of reaction to a more practical and controllable point by keeping the reacting mixture cooler or by using less concentrated acid. In any event, however, I am able to effect substantially complete sulphation in a much shorter time than was heretofore possible by known methods, and in addition I am able to produce a product which is lighter in color and freer of undesirable products of side reactions.

The above described method of bringing ingredients into contact is not a limitation of my invention. Any type of proportioning device suitable for bringing the constituents into contact continuously and in the proper proportions may be used. Similarly the type of mixer 9 is not a limitation of my invention, as other types may also be used. I prefer, however, to mix intimately and rapidly to effect complete merging of the constituents into a single homogeneous phase as soon as possible after the constituents are brought into contact, following which mixing, additional agitation is unnecessary.

A considerable excess of sulphating agent is usually necessary in ordinary sulphation reactions and I find that such excess will cause side reactions unless preventive measures are taken. In my invention, I find it advisable to arrest the action of the sulphating agent as soon as the reaction has progressed to the desired extent by any method such as quickly chilling the mix or neutralizing same.

I find that neutralization is to be preferred since it not only arrests the action of the excess sulphating agent but also prevents decomposition of the sulphated product, which would occur if allowed to remain in presence of excess acid at high temperatures. I prefer to carry out such neutralization in a continuous manner by bringing together in proper proportion the sulphation mix and a solution of a suitable neutralizing agent and mixing same in a suitable manner to effect neutralization.

The preferred method of neutralization with aqueous solutions of neutralizing agents will be more clearly understood if reference is again made to Figure 1. I have provided neutralization tanks 20, of which two are shown, alternate use being necessary to maintain continuous operation. Tank 20 is provided with a jacket 21, through which a suitable cooling medium can be circulated in order to remove the heat of neutralization, and an agitator 22 to effect mixing of the introduced ingredients. Each tank is also provided with a circulating device comprising conduit 23, circulating pump 24, conduit 25 and return 26. Line 27 is provided for removing the contents of the tank either completely or partially as may be desired when the desired charge of completely neutralized product has accumulated in the tank. Of course suitable valves and connections are provided so that the two tanks shown (or more if desired) may be alternately used without interruption of the process. In removing the completely neutralized material from the tanks I prefer to leave a sufficient amount of same to act as carrier for the first portion of unneutralized sulphation mix delivered to the tank. I prefer to contact the sulphation mix and the neutralizing agent in the following manner, it being understood that I am not limited thereto.

The mix issuing from coil 18 passes through conduit 19 and enters conduit 23 conducting neutralized sulphation mix to pump 24 which then forces the mixture through conduit 25 and return 26 to tank 20. The correct proportion of neutralizing agent is delivered from storage tank 28 through conduit 29 and flow meter 30 by means of variable delivery pump 31 through conduit 32 and inlet 33 into tank 20, the neutralized material accumulating therein until the tank is full and then emptied. I find that dilution of the unneutralized sulphated alcohol with neutralized material avoids localized overheating when the concentrated neutralizing agent is added. Agitator 22 effects contact of the neutralizing agent and sulphation mix while the heat of neutralization is removed by means of a suitable cooling medium circulated through jacket 21.

In Figure 2 is shown an alternate method of effecting continuous neutralization. The materials conducted by conduits 19 and 32, respectively, are combined in the mixing chamber 34 which sprays the reacting materials against a splash funnel 35 contained within flash tank 36. This tank may be operated at atmospheric pressure, or with the aid of a vacuum producing means and a barometric condenser 37, or other suitable equipment well known in the art, may be operated under subatmospheric pressure. Under such conditions of operation sufficient heat is evolved to evaporate a substantial amount of the water and thereby produce a neutralized sulphated product directly in concentrated paste form. Of course under certain conditions of operation a substantially dry product may be obtained.

In addition, the volatilization of the water from the mixture acts in effect as a steam distillation and effectively and economically removes to a greater or less extent the volatile unsulphated alcohols or other volatile impurities, some of which may have a deleterious effect on the valuable characteristics of the main product.

Thus it will be seen that one may or may not absorb the heat of neutralization with a cooling medium in carrying out the neutralization step of my process.

The alcohols which may be sulphated in accordance with my invention are those which are normally fluid, or which can be easily converted into fluid form, for example, by the adjustment of temperature or by the use of suitable inert solvents such as nitrobenzene, low boiling hydrocarbons, and their chlorinated derivatives such as trichlorethylene, ethylene dichloride and carbon tetrachloride. More specifically the alcohols which may be employed either singly or in admixture are those aliphatic alcohols containing eight or more carbon atoms in the molecule, such as those obtainable from vegetable and animal fats, fatty oils, and waxes, for example, coconut oil, tallow, sperm oil and the like. Those higher alcohols which are derivable from oils of the coconut oil class, including palm kernel oil and corozo nut oil as well as coconut oil and similar tropical nut oils characterized by their relatively high content of lauric acid-glycerin ester and by their high saponification number, are especially useful in the production of valuable wetting, emulsifying, and detergent agents for use in the textile industry and other spheres. Alcohols obtained from these sources include decyl, duodecyl, tetradecyl, hexadecyl, octadecyl, octadecenyl, and others.

The sulfating agents which may be used in practicing my invention are concentrated sulphuric acid, (including fuming sulphuric acid), chlorsulphonic acid and the like. Although I prefer liquid sulfating agents, the use of sulfating agents such as sulphur trioxide in gaseous form is also possible, but suitable types of proportioning and mixing equipment, of course, are necessary. Liquid sulphur trioxide may also be used, but the system must be of the closed type with suitable discharge means whereby the constituents of the reaction mix are maintained in liquid condition until discharged. When sulphating agents such as chlorsulphonic acid are used, I find that suitable means for the disposition of the hydrohalic acid gas evolved is necessary.

My invention will be more clearly understood from the following example in which I describe the method as applied to the production of a detergent containing as the main active ingredient the sodium salt of the sulphuric acid ester of the higher alcohols derived from coconut oil by high pressure hydrogenation.

*Example 1.*—Coconut oil alcohols having a hydroxyl number of about 290 are charged to storage tank I and sulphuric acid of 100 per cent strength (made by adding fuming sulphuric acid to ordinary concentrated sulphuric acid) is charged to storage tank II. The neutralizing agent, which consists of a 50° Bé. (50 per cent) solution of sodium hydroxide is charged to storage tank 28. The variable delivery pumps for the alcohol (5), the acid (15) and the sodium hydroxide solution (25) are set so as to deliver 1000 pounds, 1750 pounds and 2485 pounds per hour, respectively. The three pumps are simultaneously started and the reactants at ordinary room temperature are mixed in the manner shown in the drawing, the streams of alcohol and acid being combined and mixed, and the streams of this mixture and the alkali solution then being combined and mixed.

The reaction coil 18 should be of sufficient size so that the period required for the mixture of sulphuric acid and alcohol to pass therethrough is about 12 seconds. The temperature of the reaction mix delivered to the point of neutralization will be in the neighborhood of 200° F., and on addition of the caustic soda solution there will be produced a product which will be in paste form containing about 36 per cent water and 64 per cent solids of which about 3 per cent comprises unsulphated material, about 56 per cent is sodium sulphate and about 41 per cent is the sodium salt of the sulphuric reaction product produced.

In actual comparative washing tests conducted under standardized conditions, I found that one part of the product made in accordance with my continuous method was equivalent in detergent effect to one and a half parts of a product made in accordance with previously known methods from the same materials and containing approximately the same amount of actual sodium alkyl sulphate. My product was also found to be far superior in sudsing power and in the stability of the suds produced. These improved properties are believed to be due to the reduced amount of reaction by-products in my product.

The above example is intended to be illustrative only and the invention is not to be considered so limited in nature. For example, other high molecular aliphatic alcohols having more than eight carbon atoms per molecule such as those secondary alcohols derived from paraffin oils by oxidation may be used.

Although I have described my invention only as applied to the sulphation of high molecular weight aliphatic alcohols, it may also be applied in the sulphation and/or sulphonation of other sulphatable and/or sulphonatable organic materials such as, for example, low molecular weight aliphatic alcohols, low and high molecular weight unsaturated aliphatic alcohols and hydrocarbons, low and high molecular weight fatty acids, ketones, ethers, and their derivatives, and corresponding aromatic, hydroaromatic, and aliphatic-aromatic compounds. I have found, for example, that a greatly improved Turkey red oil results if my process is applied to the sulphation and subsequent neutralization of castor oil.

It is possible, of course, to apply the invention to reactions involving "true sulphonation", the reaction in which the sulphur atom is attached directly to the carbon atom as well as "sulphation", the reaction in which the sulphur atom is attached to the carbon atom through an oxygen atom, and in the claims the respective reactions are so designated. However, the word "sulphonation", unqualified, is also used as a generic term to include both "true sulphonation" and "sulphation".

Moreover, the terminology "alkyl sulphate", "sulphuric acid ester", etc., in the specification and claims is intended to include those products containing a minor proportion of other sulphonated material unavoidably produced along with the alkyl sulphate proper.

In addition to the previously referred to advantages my invention results in a great reduction of the size, initial cost, maintenance cost and operating cost of sulphating equipment per pound of product made, and also, contrary to all expectations, makes available the advantages of truly continuous operation to sulphation processes.

Summarizing, the outstanding advantages of my invention are:

1. Lighter colored products.
2. Purer products, as regards undesirable by-products of side reactions.
3. The rapidity with which the reaction is conducted.
4. Continuous production.
5. Reduction in floor space required for equipment.
6. Reduction in amount and cost of initial installation.
7. Reduction in the cost of maintenance of the equipment.
8. Reduction in operating costs.

Having thus described my invention, what I claim and desire to secure by Letters Patent is:

1. A continuous process of sulphonation which comprises bringing together continuously flowing streams of a sulphonating agent and an aliphatic alcoholic hydroxy compound in the full proportions required for the desired degree of sulphonation, allowing the mixture to react during its flow without substantially restraining the rise of temperature due to chemical reaction and continuously delivering the reaction mixture to a reaction arresting treatment.

2. A continuous process of producing a neutralized sulphuric reaction product which comprises bringing together continuously flowing streams of a sulphonating agent and an aliphatic alcoholic hydroxy compound in the full proportions required for the desired degree of sulphonation, continuously and thoroughly mixing the combined constituents, allowing the heat of reaction to raise the temperature of the reaction mix without substantial restraint and continuously delivering the reaction mixture to a reaction arresting treatment, said treatment comprising the continuous commingling with the reaction mixture of a neutralizing agent.

3. A continuous process of producing a neutralized sulphuric reaction product which comprises bringing together continuously flowing streams of a sulphonating agent and an aliphatic alcoholic hydroxy compound in the full proportions required for the desired degree of sulphonation, continuously and thoroughly mixing the combined constituents, allowing the heat of reaction to raise the temperature of the reaction mix without substantial restraint and continuously delivering the reaction mixture to a reaction arresting treatment, said treatment comprising the simultaneous introduction of the flowing stream of the reaction mixture and a flowing stream of a neutralizing agent into a bath of neutralized reaction mixture.

4. A continuous and rapid process for preparing a sulphuric acid ester of a high molecular aliphatic alcohol which comprises bringing together continuously flowing streams of concentrated sulphuric acid and an aliphatic alcohol containing more than eight carbon atoms in the molecule in the full proportions required for the desired degree of sulphation, continuously and intimately mixing the combined constituents mechanically, allowing the heat of chemical reaction to raise the temperature of the mixture whereby reaction occurs to the desired extent, and continuously arresting the action of the sulphuric acid before undesirable side reactions occur to any substantial extent.

5. A continuous and rapid process of preparing a sulphonated higher aliphatic alcohol, which comprises bringing together continuously flowing streams of a higher aliphatic alcohol in liquid condition and a sulphonating agent in the full proportions required for the desired degree of sulphonation, continuously and thoroughly mixing the combined constituents, continuously passing the mixture after said mixing through a reaction zone, permitting the reaction to proceed to the desired extent without subsantially restraining the rise in temperature due to chemical reaction and continuously arresting the action of said sulphonating agent before undesirable side reactions occur to any substantial extent.

6. A continuous and rapid process of preparing a sulphonated higher aliphatic alcohol, which comprises bringing together continuously flowing streams of a higher aliphatic alcohol in liquid condition and a sulphonating agent in the full proportions required for the desired degree of sulphonation, continuously and thoroughly mixing the combined constituents, continuously passing the mixture after said mixing through a reaction zone wherein the desired degree of sulphonation takes place, allowing the heat formed during the reaction to raise the temperature of the reaction mix without artificial cooling, and continuously arresting the action of said sulphonating agent when the reaction has progressed to the desired extent and before undesirable side reactions have occurred to any substantial extent.

7. A continuous and rapid process for the preparation of a wetting, emulsifying and detergent agent of the sulphuric acid ester type, which comprises bringing together continuously flowing streams of concentrated sulphuric acid at substantially room temperature and an aliphatic alcohol in a liquid condition in the full proportions required for the desired degree of sulphation, the said alcohol having more than eight carbon atoms in the molecule, continuously and thoroughly mixing the combined constituents, continuously passing the mixture after said mixing through a reaction zone wherein the constituents react to the desired extent, allowing the heat formed during the reaction to raise the temperature of the reaction mix and continuously neutralizing the mixture when the reaction has progressed to the desired extent and before any undesired side reactions have occurred to any substantial extent.

8. A continuous and rapid process for the preparation of a wetting, emulsifying and detergent agent of the sulphuric acid ester type, which comprises bringing together continuously flowing streams of concentrated sulphuric acid at substantially room temperature and an aliphatic alcohol in liquid condition in the full proportions required for the desired degree of sulphation, the said aliphatic alcohol having more than eight carbon atoms in the molecule, continuously and thoroughly mixing the combined constituents, continuously passing the mixture after said mixing through a reaction zone wherein reaction to the desired degree takes place, allowing the heat formed during the reaction to raise the temperature of the reaction mix without artificial cooling, and continuously neutralizing the mixture when the reaction has progressed to the desired extent and before undesirable side reactions have occurred to any substantial extent.

9. A continuous process for the preparation of a water-soluble detergent agent of the alkyl sulphate type, which comprises bringing together continuously flowing streams of a mixture of higher alcohols containing an appreciable proportion of lauryl alcohol and a concentrated sulphuric acid in predetermined proportions required for the desired degree of sulphation, allowing the mixture to react during its flow without substantially restraining the rise of temperature due to chemical reaction and continuously delivering the reaction mixture to a reaction arresting treatment, said treatment comprising the continuous commingling with the reaction mixture of a neutralizing agent adapted to form a water-soluble salt of the reaction product.

10. A continuous process of producing a water-soluble detergent agent of the alkyl sulphate type, which comprises bringing together continuously flowing streams of a mixture of higher alcohols containing an appreciable proportion of lauryl alcohol and a concentrated sulphuric acid in predetermined proportions required for the desired degree of sulphation, allowing the mixture to react during its flow without substantially restraining the rise of temperature due to chemical reaction and continuously delivering the reaction mixture to a reaction arresting treatment, said treatment comprising introducing the flowing stream of the reaction mixture and a flowing stream of a neutralizing agent into a bath of neutralized reaction mixture.

11. A continuous and rapid process for the preparation of a wetting, emulsifying and detergent agent of the sulphuric acid ester type, which comprises continuously bringing together a flowing stream of concentrated sulphuric acid and a flowing stream of a higher molecular alcohol derived from an oil of the coconut oil type in the full proportions required for the desired degree of sulphation, continuously and thoroughly mixing the combined constituents, passing the mixture after said mixing through a reaction zone wherein the constituents react to the desired extent, allowing the heat formed during the reaction to raise the temperature of the reaction mix and continuously neutralizing the mixture when the reaction has progressed to the desired extent and before undesirable side reactions have occurred to any substantial extent.

12. A continuous and rapid process for the preparation of a wetting, emulsifying and detergent agent of the sulphuric acid ester type, which comprises continuously bringing together at substantially room temperature a flowing stream of sulphuric acid about 100 per cent in strength and a flowing stream of a higher molecular alcohol derived from coconut oil in the full proportions required for the desired degree of sulphation, continuously and thoroughly mixing the combined constituents mechanically, continuously passing the mixture after said mixing through a reaction zone wherein the constituents react to the desired extent, allowing the heat of reaction to raise the temperature of the mix without substantial restraint and continuously neutralizing the mixture when the reacion has progressed to the desired extent and before any undesirable side reactions have occurred to any substantial extent.

VICTOR MILLS.